US009557186B2

(12) United States Patent
Kim et al.

(10) Patent No.: US 9,557,186 B2
(45) Date of Patent: Jan. 31, 2017

(54) ELECTRONIC DEVICE AND CONTROL METHOD FOR THE ELECTRONIC DEVICE

(71) Applicant: LG ELECTRONICS INC., Seoul (KR)

(72) Inventors: Sujin Kim, Seoul (KR); Yonghwan Lee, Yongin-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/760,771

(22) PCT Filed: Jan. 16, 2013

(86) PCT No.: PCT/KR2013/000319
§ 371 (c)(1),
(2) Date: Jul. 14, 2015

(87) PCT Pub. No.: WO2014/112659
PCT Pub. Date: Jul. 24, 2014

(65) Prior Publication Data
US 2015/0369620 A1 Dec. 24, 2015

(51) Int. Cl.
*G01C 21/34* (2006.01)
*G09B 19/16* (2006.01)
(Continued)

(52) U.S. Cl.
CPC ....... *G01C 21/3469* (2013.01); *G01C 21/3484* (2013.01); *G01C 21/3605* (2013.01);
(Continued)

(58) Field of Classification Search
CPC .. G01C 21/34; G01C 21/36; B60K 2350/1092
See application file for complete search history.

(56) References Cited

U.S. PATENT DOCUMENTS 7,783,417 B2 * 8/2010 Vavrus ............... G01C 21/3469
701/423
2010/0049397 A1 * 2/2010 Liu .................. G08G 1/096833
701/31.4
(Continued)

FOREIGN PATENT DOCUMENTS

JP 2010-151115 A 7/2010
KR 10-2010-0022151 A 3/2010
(Continued)

OTHER PUBLICATIONS

International Search Report dated Oct. 14, 2013 for Application No. PCT/KR2013/000319, 2 Pages.

*Primary Examiner* — Thomas Tarcza
*Assistant Examiner* — Alex C Dunn
(74) *Attorney, Agent, or Firm* — Fish & Richardson P.C.

(57) ABSTRACT

The present disclosure relates to an electronic device capable of providing route information and a control method thereof. An electronic device according to an embodiment of the present disclosure may include a user input unit configured to receive destination information, a retrieval unit configured to retrieve an eco-driving route capable of minimizing the fuel consumption amount of a vehicle among driving routes for reaching a location corresponding to the destination information, and a controller configured to modify a prestored fuel table based on an actually consumed fuel amount while driving the vehicle, wherein the retrieval unit retrieves the eco-driving route using the modified fuel table.

20 Claims, 11 Drawing Sheets

(51) Int. Cl.
  *G09B 29/00* (2006.01)
  *G01C 21/36* (2006.01)
  *G08G 1/0968* (2006.01)

(52) U.S. Cl.
  CPC ......... *G09B 19/167* (2013.01); *G09B 29/007* (2013.01); *G08G 1/096827* (2013.01); *G08G 1/096838* (2013.01)

(56) References Cited

U.S. PATENT DOCUMENTS

| | | | | |
|---|---|---|---|---|
| 2011/0288765 | A1* | 11/2011 | Conway | G01C 21/3469 701/533 |
| 2013/0041621 | A1* | 2/2013 | Smith | B60W 50/14 702/142 |
| 2013/0073113 | A1* | 3/2013 | Wang | B60K 6/445 701/1 |
| 2013/0085652 | A1* | 4/2013 | McGuffin | F02D 41/266 701/101 |

FOREIGN PATENT DOCUMENTS

| | | |
|---|---|---|
| KR | 10-2010-0090128 A | 8/2010 |
| KR | 10-2012-0061697 A | 6/2012 |
| KR | 10-2012-0132993 A | 12/2012 |

* cited by examiner (a)

(b)

(a)

(b)

| | SPEED | 50 | 60 | 70 | 80 | 90 | 100 | 110 | 120 |
|---|---|---|---|---|---|---|---|---|---|
| SLOPE | | | | | | | | | |
| -6 | | 0 | 0 | 0 | 1.6 | 1.8 | 2.4 | 2.8 | 3.3 |
| -3 | | 1.3 | 2.5 | 3.6 | 4.5 | 5.3 | 6.4 | 7.0 | 7.9 |
| 0 | | 3.5 | 4.7 | 5.8 | 6.7 | 7.8 | 8.9 | 9.5 | 10.6 |
| 3 | | 7.3 | 8.5 | 9.6 | 10.9 | 11.2 | 13.5 | 14.6 | 15.9 |
| 6 | | 12.3 | 12.6 | 13.5 | 14.6 | 15.7 | 16.8 | 17.8 | 18.9 |
| 9 | | 15.1 | 16.5 | 17.8 | 18.5 | 19.7 | 20.5 | 21.6 | 22.4 |

FUEL TABLE

Fig. 6b
|  | FUEL TABLE | | | | | | | |
|---|---|---|---|---|---|---|---|---|
| SPEED / SLOPE | 50 | 60 | 70 | 80 | 90 | 100 | 110 | 120 |
| -6 | 0 | 0 | 1.1 | 1.6 | 1.8 | 2.4 | 2.8 | 3.3 |
| -3 | 1.3 | 2.5 | 3.6 | 4.5 | 6.3 | 6.4 | 7.0 | 7.9 |
| 0 | 3.5 | 4.7 | 3.3 | 6.7 | 7.8 | 8.9 | 9.5 | 10.6 |
| 3 | 7.3 | 8.5 | 9.6 | 10.9 | 11.2 | 13.5 | 14.6 | 15.9 |
| 6 | 12.3 | 12.5 | 13.5 | 14.6 | 15.3 | 16.8 | 17.3 | 18.9 |
| 9 | 15.1 | 16.5 | 17.8 | 18.5 | 19.7 | 20.3 | 21.6 | 22.4 |
Fig. 7a
(a)
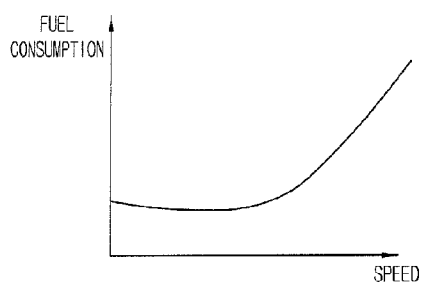
(b)
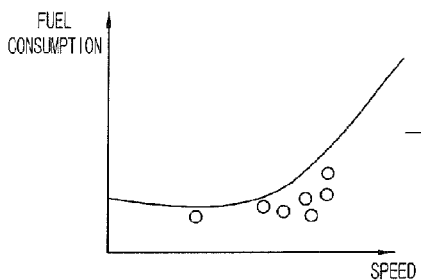
(c)
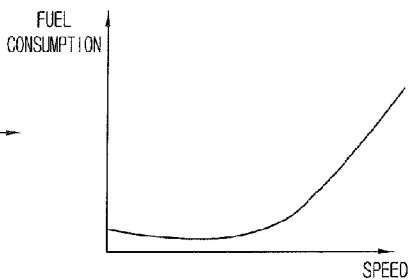

Fig. 7b

| FUEL TABLE | | | | | | | | |
|---|---|---|---|---|---|---|---|---|
| SLOPE \ SPEED | 50 | 60 | 70 | 80 | 90 | 100 | 110 | 120 |
| -6 | 0 | 0 | 1.1 | 1.6 | 1.8 | 2.4 | 2.8 | 3.3 |
| -3 | 1.3 | 2.5 | 3.6 | 4.5 | 6.3 | 6.4 | 7.0 | 7.9 |
| 0 | 3.5 | 4.7 | 3.3 | 6.7 | 7.8 | 8.9 | 9.5 | 10.6 |
| 3 | 7.3 | 8.5 | 9.6 | 10.9 | 11.2 | 13.5 | 14.6 | 15.9 |
| 6 | 12.2 | 12.5 | 13.3 | 14.3 | 15.3 | 16.3 | 17.3 | 18.2 |
| 9 | 15.1 | 16.5 | 17.8 | 18.5 | 19.7 | 20.3 | 21.6 | 22.4 |

Fig. 8a 810    820    830

| FUEL TABLE | STATUS INFORMATION | DRIVER INFORMATION | | | | | | |
|---|---|---|---|---|---|---|---|---|
| FUEL TABLE | | | | | | | | |
| SLOPE \ SPEED | 50 | 60 | 70 | 80 | 90 | 100 | 110 | 120 |
| -6 | 0 | 0 | 1.1 | 1.6 | 1.8 | 2.4 | 2.8 | 3.3 |
| -3 | 1.3 | 2.5 | 3.6 | 4.5 | 6.3 | 6.4 | 7.0 | 7.9 |
| 0 | 3.5 | 4.7 | 3.3 | 6.7 | 7.8 | 8.9 | 9.5 | 10.6 |
| 3 | 7.3 | 8.5 | 9.6 | 10.9 | 11.2 | 13.5 | 14.6 | 15.9 |
| 6 | 12.2 | 12.5 | 13.3 | 14.3 | 15.3 | 16.3 | 17.3 | 18.2 |
| 9 | 15.1 | 16.5 | 17.8 | 18.5 | 19.7 | 20.3 | 21.6 | 22.4 |

Fig. 8b 810    820    830

| FUEL TABLE | STATUS INFORMATION | DRIVER INFORMATION |
|---|---|---|
| ENGINE TYPE | DIESEL | |
| ENGINE DETERIORATION | | |
| TIRE PRESSURE | | |
| ENGINE OIL | | |
| BREAK STATUS | | |

Fig. 8c

| FUEL TABLE | STATUS INFORMATION | DRIVER INFORMATION |

810, 820, 830

SEX : FEMALE      PREFERRED ROAD : EXPRESS HIGHWAY

AGE : 29          SIGNAL OBSERVANCE [====]

DISPOSITION : EXTROVERTED   OVERSPEED LEVEL [====]

DRIVING EXPERIENCE : 1 YEAR

Fig. 9a (a)

SPEED : 75km/h

FUEL CONSUMPTION : 12.5 LITER  AVERAGE : 11.5 LITER

CAUSE INFORMATION : EXPRESS HIGHWAY (b)

SPEED : 74km/h

FUEL CONSUMPTION : 10.4 LITER  AVERAGE : 11.4 LITER

CAUSE INFORMATION : GENERAL ROAD (a)

(b)

(a)

| DRIVER 1 | | | | | | | | |
|---|---|---|---|---|---|---|---|---|
| FUEL TABLE | | | | | | | | |
| SLOPE\SPEED | 50 | 60 | 70 | 80 | 90 | 100 | 110 | 120 |
| -6 | 0 | 0 | 1.1 | 1.8 | 1.8 | 2.4 | 2.8 | 3.3 |
| -3 | 1.3 | 2.5 | 3.6 | 4.5 | 6.3 | 6.9 | 7.0 | 7.9 |
| 0 | 3.5 | 4.3 | 3.3 | 6.7 | 7.8 | 8.9 | 9.5 | 10.6 |
| 3 | 7.3 | 8.5 | 9.6 | 10.9 | 11.2 | 13.5 | 14.6 | 15.9 |
| 6 | 12.2 | 12.5 | 13.3 | 14.3 | 16.0 | 16.3 | 17.5 | 18.2 |
| 9 | 15.1 | 16.5 | 17.8 | 18.5 | 19.7 | 20.3 | 21.6 | 22.4 |

(b)

| DRIVER 1 | | | | | | | | |
|---|---|---|---|---|---|---|---|---|
| FUEL TABLE | | | | | | | | |
| SLOPE\SPEED | 50 | 60 | 70 | 80 | 90 | 100 | 110 | 120 |
| -6 | 0 | 0 | 1.1 | 1.6 | 1.8 | 2.4 | 2.8 | 3.3 |
| -3 | 1.3 | 2.5 | 4.0 | 4.5 | 6.3 | 6.7 | 7.0 | 7.9 |
| 0 | 3.5 | 4.7 | 3.3 | 6.7 | 7.8 | 8.9 | 9.5 | 10.6 |
| 3 | 7.3 | 8.3 | 9.6 | 10.9 | 11.2 | 13.5 | 14.6 | 16.5 |
| 6 | 12.2 | 12.5 | 13.3 | 14.3 | 15.3 | 16.3 | 17.3 | 18.2 |
| 9 | 15.1 | 16.5 | 17.8 | 19.0 | 19.7 | 21.0 | 21.6 | 23.0 |

(c)

| DRIVER 1 | | | | | | | | |
|---|---|---|---|---|---|---|---|---|
| FUEL TABLE | | | | | | | | |
| SLOPE\SPEED | 50 | 60 | 70 | 80 | 90 | 100 | 110 | 120 |
| -6 | 0 | 0 | 1.1 | 1.6 | 1.8 | 2.4 | 2.8 | 3.3 |
| -3 | 1.3 | 2.5 | 3.6 | 4.5 | 6.3 | 6.4 | 7.0 | 7.9 |
| 0 | 3.5 | 4.7 | 3.3 | 6.7 | 7.8 | 8.9 | 9.5 | 10.6 |
| 3 | 7.3 | 8.5 | 9.6 | 10.9 | 11.2 | 13.5 | 14.6 | 15.9 |
| 6 | 12.2 | 12.5 | 13.3 | 14.3 | 15.3 | 16.3 | 17.3 | 18.2 |
| 9 | 15.1 | 16.5 | 17.8 | 18.5 | 19.7 | 20.3 | 21.6 | 22.4 |

ELECTRONIC DEVICE AND CONTROL METHOD FOR THE ELECTRONIC DEVICE

CROSS REFERENCE TO RELATED APPLICATIONS

This application is a U.S. National Phase Application under 35 U.S.C. §371 of International Application No. PCT/KR2013/000319, filed on Jan. 16, 2013, the entire contents of which is hereby incorporated by reference in its entirety.

TECHNICAL FIELD

The present disclosure relates to an electronic device capable of providing route information and a control method thereof.

BACKGROUND ART

With the rapid development of the information age, the importance of an information input/output function and a data storage function has been emphasized in an electronic device. The electronic device having those functions can be classified into a portable electronic device such as a mobile station and a stationary electronic device such as an image display device, a refrigerator, and the like.

On the other hand, as the functions become diversified, the electronic device is implemented in the form of a multimedia player having complicated functions such as capturing still or moving images, playing music or video files, gaming, receiving broadcast signals, and the like. Moreover, the electronic device provides information on locations and paths where the user wants to go. Furthermore, the electronic device provides a route capable of reducing the fuel consumption amount. However, the route capable of reducing the fuel consumption amount is retrieved only on the basis of predetermined information.

DISCLOSURE OF INVENTION

Technical Problem

An object of the present disclosure is to provide an electronic device capable of providing route information optimized for the user to reduce a fuel consumption amount, and a control method thereof.

Solution to Problem

In order to accomplish the foregoing objective, an electronic device according to an embodiment of the present disclosure may include a user input unit configured to receive destination information, a retrieval unit configured to retrieve an eco-driving route capable of minimizing the fuel consumption amount of a vehicle among driving routes for reaching a location corresponding to the destination information, and a controller configured to modify a prestored fuel table based on an actually consumed fuel amount while driving the vehicle, wherein the retrieval unit retrieves the eco-driving route using the modified fuel table.

According to an embodiment, the controller may monitor the actually consumed fuel amount with preset time intervals while driving the vehicle independently from retrieving the eco-driving route, and modify the prestored fuel table using the monitored result.

According to an embodiment, the controller may subtract a difference value between an expected fuel consumption amount contained in the prestored fuel table and the actually consumed fuel amount to modify the prestored fuel table.

According to an embodiment, the actually consumed fuel amount may be dependent on cause information, and the cause information may include at least one of topographical information, driving habit information of a driver who drives the vehicle and the status information of the vehicle.

According to an embodiment, the controller may monitor the cause information at the same time when monitoring the actually consumed fuel amount.

According to an embodiment, the retrieval unit may retrieve a driving route different from a driving route corresponding to the cause information as the eco-driving route when the actually consumed fuel amount is greater than a preset reference amount among driving routes for reaching the location.

According to an embodiment, the topological information may include information associated with at least one of a driving route slope, a signal light layout level and a road characteristic.

According to an embodiment, the road characteristic may be associated with whether the road being driven by the vehicle is an express highway or general road, and the controller may monitor an actually consumed fuel amount based on the unit of kilometer when the vehicle is driven on an express highway and a consumed fuel amount based on the unit of kilometer when the vehicle is driven on a general road, and the controller may control the retrieval unit to retrieve a driving route corresponding to the road characteristic for which the actually consumed fuel amount is less than the other between the express highway and general road based on the monitored result.

According to an embodiment, the status information of the vehicle may be associated with at least one of a type of engine, a deterioration level of engine, and a tire pressure.

According to an embodiment, the electronic device may further include a display unit, wherein the retrieval unit retrieves at least one another driving route along with the eco-driving route, and the controller controls the display unit to display a plurality of driving routes retrieved by the retrieval unit, and outputs expected fuel consumption amounts for the plurality of driving routes, respectively.

According to an embodiment, the controller may store the modified fuel table in a memory separately from the prestored fuel table.

According to an embodiment, the controller may generate at least one of different modified fuel tables to correspond to drivers who drive the vehicle, respectively, to store it in the memory, and reflect a fuel amount actually consumed by the vehicle on a modified fuel table corresponding to a first driver when the first driver drives the vehicle among drivers who drive the vehicle.

According to an embodiment, the retrieval unit may retrieve different eco-driving routes based on different drivers who drive the vehicle based on different modified fuel tables based on drivers who drive the vehicle.

According to an embodiment, the controller may retrieve a fuel table corresponding to the first driver among the different modified fuel tables using the identification information of the first driver, and the identification information of the first driver may be received from an external device through near field communication, received from the user through the display unit, or received through the first driver's voice.

According to an embodiment, the controller may receive at least one disposition information from a driver who drives the vehicle, and receive a fuel table corresponding to the disposition information from a cloud server using wireless communication, and the retrieval unit may retrieve the eco-driving route using at least one of the fuel table received from the cloud server and the prestored fuel table.

According to an embodiment, the controller may output a plurality of question items capable of determining the disposition of a driver who drives the vehicle on the display unit, and acquire the disposition information through information input to the question items, respectively.

According to an embodiment, the controller may modify a fuel table received from the cloud server based on an actually consumed fuel amount while driving the vehicle when an eco-driving route retrieved using the fuel table received from the cloud server is selected.

A control method of an electronic device according to an embodiment of the present disclosure may include receiving destination information, retrieving an eco-driving route capable of minimizing the fuel consumption amount of a vehicle using a prestored fuel table among driving routes for reaching a location corresponding to the destination information, guiding a route to the location using the eco-driving route when the eco-driving route is selected, monitoring an actually consumed fuel amount while driving the eco-driving route; and modifying the prestored fuel table using the monitored result.

According to an embodiment, said modifying step may modify the prestored fuel table by adding or subtracting the actually consumed fuel amount to or from the prestored fuel table.

According to an embodiment, said retrieving step may retrieve at least one different driving route along with the eco-driving route, and display the plurality of retrieved driving routes on the display unit, and select any one of the plurality of routes.

Advantageous Effects of Invention

According to an electronic device and control method thereof in accordance with an embodiment of the present disclosure, an actually consumed fuel amount may be reflected on the fuel table. Accordingly, a driving route capable of minimizing the actually consumed fuel amount may be recommended to a vehicle's driver.

Furthermore, according to an electronic device and control method thereof in accordance with an embodiment of the present disclosure, an actually consumed fuel amount may be continuously monitored while driving the vehicle, and the actually consumed fuel amount may be reflected on the fuel table, thereby providing a more accurate driving route capable of minimizing the fuel consumption amount as further driving the vehicle.

BRIEF DESCRIPTION OF DRAWINGS

FIGS. 5A and 5B are conceptual views for explaining a control method described in FIG. 4;

FIGS. 6A, 6B, 7A and 7B are conceptual views for explaining a method of modifying a fuel table in an electronic device according to an embodiment of the present disclosure;

FIGS. 8A, 8B and 8C are conceptual views for explaining a method of providing a customized fuel table in an electronic device according to an embodiment of the present disclosure;

FIGS. 9A and 9B are conceptual views for explaining cause information in an electronic device according to an embodiment of the present disclosure;

FIGS. 10A, 10B and 10C are conceptual views for explaining a method of providing different fuel tables based on drivers in an electronic device according to an embodiment of the present disclosure.

MODE FOR THE INVENTION

Figure 1:
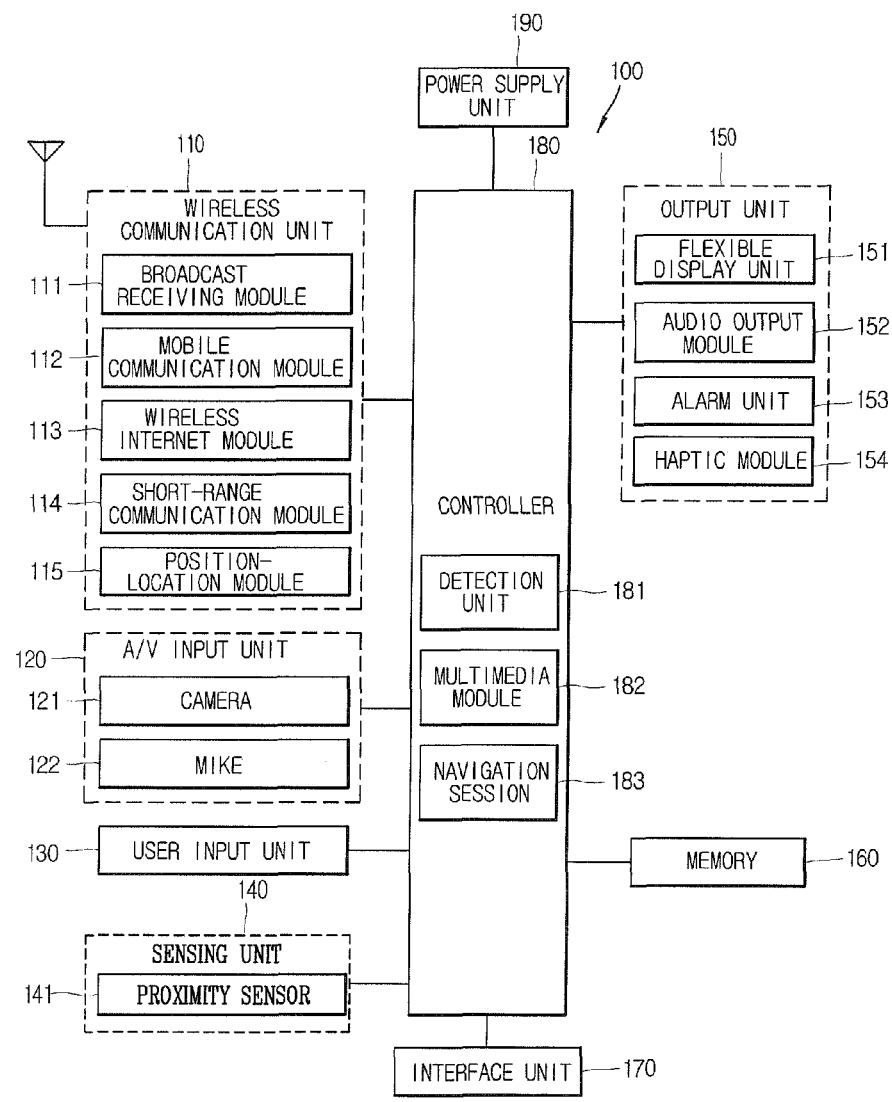
FIG. 1 is a block diagram illustrating the configuration of an electronic device according to an embodiment of the present disclosure.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the concept of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

A suffix "module" or "unit" used for constituent elements used in the present disclosure is merely intended for easy description of the specification, and the suffix itself does not give any special meaning or function.

Furthermore, in the present disclosure, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments according to the present disclosure will be described in detail with reference to the accompanying drawings, and the same or similar elements are designated with the same numeral references regardless of the numerals in the drawings and their redundant description will be omitted.

In describing the present disclosure, moreover, the detailed description will be omitted when a specific description for publicly known technologies to which the invention pertains is judged to obscure the gist of the present invention. Also, it should be noted that the accompanying drawings are merely illustrated to easily explain the concept of the invention, and therefore, they should not be construed to limit the technological concept disclosed herein by the accompanying drawings.

An electronic device disclosed herein may include a portable phone, a smart phone, a laptop computer, a digital broadcast terminal, a personal digital assistant (PDA), a portable multimedia player (PMP), a navigation, a slate PC, a tablet PC, an ultrabook, a telematics terminal, and the like.

As illustrated in FIG. 1, the mobile communication terminal 100 may include a wireless communication unit 110, an A/V (Audio/Video) input unit 120, a user input unit 130, a sensing unit 140, an output unit 150, a memory 160, an interface unit 170, a controller 180, a power supply unit 190, and the like. All the elements of the mobile communication terminal 100, as illustrated in FIG. 1, are not necessarily required, and therefore, the mobile communication terminal 100 may be implemented with greater or less elements than the elements as illustrated in FIG. 1.

The wireless communication unit 110 typically includes one or more elements allowing radio communication between the mobile communication terminal 100 and a wireless communication system, or allowing radio communication between radio communication the mobile communication terminal 100 and a network in which the mobile communication terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile communication terminal 100. The broadcast associated information may mean information regarding a broadcast channel, a broadcast program, a broadcast service provider, and the like. The broadcast signal may include a TV broadcast signal, a radio broadcast signal and a data broadcast signal as well as a broadcast signal in a form that a data broadcast signal is combined with the TV or radio broadcast signal.

On the other hand, the broadcast associated information may also be provided through a mobile communication network, and in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile communication terminal 100. Here, it may be used a wireless Internet access technique including a WLAN (Wireless LAN), Wi-Fi, WiBro (Wireless Broadband), WiMax (World Interoperability for Microwave Access), HSDPA (High Speed Downlink Packet Access), and the like.

The short-range communication module 114 means a module for supporting a short-range communication. Here, it may be used a short-range communication technology including Bluetooth, Radio Frequency Identification (RFID), Infrared Data Association (IrDA), Ultra Wideband (UWB), ZigBee, and the like.

The location information module 115 is a module for checking or acquiring a location of the mobile terminal. A GPS module is an example. The GPS module receives location information from a plurality of satellites. Here, the location information may include coordinate information represented by latitude and longitude values. For example, the GPS module may measure an accurate time and distance from three or more satellites, and accurately calculate a current location according to trigonometry based upon three different distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. For the location information module 115, a Wi-Fi positioning system and/or a hybrid positioning system may be applicable thereto.

The A/V (audio/video) input unit 120 receives an audio or video signal, and the A/V (audio/video) input unit 120 may include a camera 121 and a microphone 122. The camera 121 processes an image frame, such as still picture or video, obtained by an image sensor in a video phone call or image capturing mode. The processed image frame may be displayed on a display unit 151.

The image frames processed by the camera 121 may be stored in the memory 160 (or other storage medium) or transmitted through the wireless communication unit 110. Two or more cameras 121 may be provided according to the configuration type and/or use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format capable of being transmitted to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the mobile terminal. The user input unit 130 may be configured by including a keypad, a dome switch, a touch pad (pressure/capacitance), a jog wheel, a jog switch, and the like. Particularly, when the touch pad forms an interlayer structure together with a display unit 151, it may be called a touch screen.

The sensing unit 140 detects a current status of the mobile communication terminal 100 such as an opened or closed state of the mobile communication terminal 100, a location of the mobile communication terminal 100, the presence or absence of user contact, an orientation of the mobile communication terminal 100, an acceleration or deceleration movement of the mobile communication terminal 100, and the like, and generates a sensing signal for controlling the operation of the mobile communication terminal 100. For example, when the mobile communication terminal 100 is a slide phone type, it may sense an opened or closed state of the slide phone. Furthermore, the sensing unit 140 takes charge of a sensing function associated with whether or not power is supplied from the power supply unit 190, whether or not an external device is coupled with the interface unit 170.

The sensing unit 140 may include a proximity sensor 141, a pressure sensor 143, a motion sensor 145, and the like. The proximity sensor 141 detects an object approaching the electronic device 100, or the presence or absence of an object existing adjacent to the electronic device 100, and the like without any mechanical contact. The proximity sensor 141 may detect a proximity object using a change of the AC magnetic field or static magnetic field, a change rate of the electrostatic capacity, or the like. Two or more proximity sensors 141 may be provided according to the aspect of configuration.

The pressure sensor 143 may detect whether or not a pressure is applied to the electronic device 100, a size of the pressure, and the like. The pressure sensor 143 may be provided at a portion where the detection of a pressure is required in the electronic device 100 according to the use environment. When the pressure sensor 143 is provided in the display unit 151, it may be possible to identify a touch input through the display unit 151 and a pressure touch input by which a pressure larger than the touch input is applied according to a signal outputted from the pressure sensor 143. Furthermore, it may be possible to know a size of the pressure applied to the display unit 151 during the input of a pressure touch.

The motion sensor 145 detects the location or movement of the mobile terminal 200 using an acceleration sensor, a gyro sensor, and the like. The acceleration sensor used in the motion sensor 145 is an element for converting an acceleration change in any one direction into an electrical signal, which is widely used with the development of microelectromechanical systems (MEMS) technology. There are various kinds of acceleration sensors from the one that is built in an airbag system of a vehicle to measure a large value of acceleration used to detect collision, to the one that measures a small value of acceleration used as an input means to recognize the detailed operation of a human hand. The acceleration sensor is typically configured by providing two or three axes in a package, and according to the used circumstances there may be a case where only one z-axis is required. Accordingly, when the x-axis or y-axis acceleration sensor is used instead of the z-axis acceleration sensor due to any reason, the acceleration sensor may be provided to be placed upright on a main substrate using a separate piece of substrate.

Furthermore, the gyro sensor is a sensor for measuring an angular speed of the electronic device 100 to detect a rotated angle with respect to each reference direction.

The output unit 150 is configured to provide an output for audio signal, video signal, or alarm signal, and the output unit 150 may include the display unit 151, an audio output module 152, an alarm unit 153, and the like.

The display unit 151 may display information processed in the electronic device 100. For example, when the electronic device 100 is in a phone call mode, the display unit 151 may display a User Interface (UI) or a Graphic User Interface (GUI) associated with a call. When the electronic device 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display. There may exist two or more display units 151 according to the implementation form of the electronic device 100. For example, an external display unit (not shown) and an internal display unit (not shown) may be provided at the same time in the electronic device 100.

When the display unit 151 and a touch sensitive sensor (hereinafter, referred to as a "touch sensor") have an interlayer structure (hereinafter, referred to as a "touch screen"), the display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure. When there is a touch input to the touch sensor, the corresponding signals are transmitted to a touch controller (not shown). The touch controller processes the received signals, and then transmits corresponding data to the controller 180. Accordingly, the controller 180 may sense which region of the display unit 151 has been touched.

A proximity sensor 141 may be arranged at an inner region of the mobile device 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as proximity touch, whereas a status that the pointer substantially comes in contact with the touch screen will be referred to as contact touch. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile device 100, e.g., sound alarming a call received or a message received, and so on. The audio output module 152 may include a receiver, a speaker, a buzzer, and so on.

The alarm 153 outputs signals notifying occurrence of events from the mobile device 100. The events occurring from the mobile device 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user s direct contact, or a user s muscular sense using a finger or a hand. The haptic module 154 may be implemented in two or more in number according to the configuration of the mobile device 100. The haptic module 154 may be provided at a place where the user can frequently make contact in the vehicle. For example, it may be provided at a steering wheel, a gear shift lever, and a seat.

The memory 160 may store a program for processing and controlling the controller 180. Alternatively, the memory 160 may temporarily store input/output data (e.g., phonebook data, messages, audios, still images, videos, and the like).

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile device 100 may operate a web storage which performs the storage function of the memory 160 on the Internet.

The interface unit 170 may generally be implemented to interface the mobile device with external devices. The interface unit 170 may allow a data reception from an external device, a power delivery to each component in the mobile device 100, or a data transmission from the mobile device 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. Here, the identification module may be configured as a chip for storing various information required to authenticate an authority to use the electronic device 100, which may include a User Identity Module (UIM), a Subscriber Identity Module (SIM), and the like. Also, the device having the identification module (hereinafter, referred to as identification device) may be implemented in a type of smart card. Hence, the identification device can be coupled to the electronic device 100 via a port. The interface unit 170 may receive data or power from an external device to transfer it to each constituent element in the electronic device 100 or transmit data within the electronic device 100 to the external device.

The interface unit 170 may serve as a path for power to be supplied from an external cradle to the mobile device 100 when the mobile device 100 is connected to the external cradle or as a path for transferring various command signals inputted from the cradle by a user to the mobile device 100. Such various command signals or power inputted from the cradle may operate as signals for recognizing that the mobile device has accurately been mounted to the cradle.

The controller 180 typically controls the overall operations of the mobile device 100. For example, the controller 180 performs the control and processing associated with telephony calls, data communications, video calls, and the like. The controller 180 may include a multimedia module 181 for reproducing multimedia data. The multimedia module 181 may be implemented in an integrated manner within the controller 180 or may be implemented in a separate manner from the controller 180.

Furthermore, the controller 180 can perform a pattern recognition processing so as to recognize writing or drawing input on the touch screen as text or image.

The power supply unit 190 receives external power and internal power under the control of the controller 180 to provide power required by various components.

Various embodiments described herein may be implemented in a medium that can be read by a computer or similar device using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself. For software implementation, the embodiments such as procedures or functions may be implemented together with separate software modules. The software modules may perform at least one function or operation described herein. Software codes can be implemented by a software application written in any suitable programming language. The software codes may be stored in the memory 160 and executed by the controller 180.

The voice recognition module 182 recognizes voice uttered by the user, and performs the relevant function according to the recognized voice signal.

A navigation session (or retrieval unit) 300 applied to the electronic device 100 displays a driving route on map data.

On the other hand, the electronic device 100 according to an embodiment disclosed herein may include a user input unit 122, 130 or 151 configured to receive destination information, a retrieval unit 183 configured to retrieve an eco-driving route capable of minimizing the fuel consumption amount of a vehicle among driving routes for reaching a location corresponding to the received destination information, and a controller 180 configured to modify a pre-stored fuel table based on an actually consumed fuel amount while driving the vehicle. Meanwhile, here the retrieval unit 183 retrieves the eco-driving route using the modified fuel table. Here, the modified fuel table may reflect an actually consumed fuel amount while a vehicle's driver actually drives the vehicle. Furthermore, the actually consumed fuel amount may be dependent on cause information, and the cause information may include at least one of topographical information, driving habit information of a driver who drives the vehicle and the status information of the vehicle. In other words, the controller 180 may monitor the actually consumed fuel amount along with the cause information, and thus may not retrieve a driving route corresponding to the cause information of a location at which the actually consumed fuel amount is greater than the reference value when retrieving the eco-driving route.

When the controller 180 and retrieval unit 183 are implemented by software, embodiments such as procedures or functions may be implemented with a separate software module performing at least one function or operation. The software codes may be implemented by a software application written in a proper programming language. Furthermore, the software codes may be implemented by the controller 180.

According to an embodiment disclosed herein, the electronic device 100 may perform communication with a vehicle terminal 700 mounted on the vehicle through the wireless communication unit 110. The vehicle terminal 700 is a device for performing control on a vehicle mounted with the vehicle terminal 700, or transmitting information for the vehicle. For instance, the vehicle terminal 700 may perform on/off control for vehicle emergency lights, perform on/off control for headlights, determines whether or not a passenger has been seated through a sensor installed on a seat within the vehicle, or perform on/off control for a horn. Furthermore, the vehicle terminal 700 may include a head-up display (HUD) or projector.

Specifically, according to an embodiment disclosed herein, the controller 180 of the electronic device 100 may provide a driving route retrieved through the retrieval unit 183 through the display unit 151 contained in the electronic device 100, and moreover, may provide the retrieved driving route to the vehicle through communication with the vehicle terminal 700.

Accordingly, the controller 180 may control to display the driving route on a dashboard of the vehicle through the vehicle terminal 700 or display it on a front glass of the vehicle using the head-up display (HUD) or projector through the vehicle terminal 700. The head-up display (HUD) may be mounted on a dashboard of the vehicle, and generally known methods may be used for the HUD and the projector, and thus the detailed description thereof will be omitted.

Figure 2:
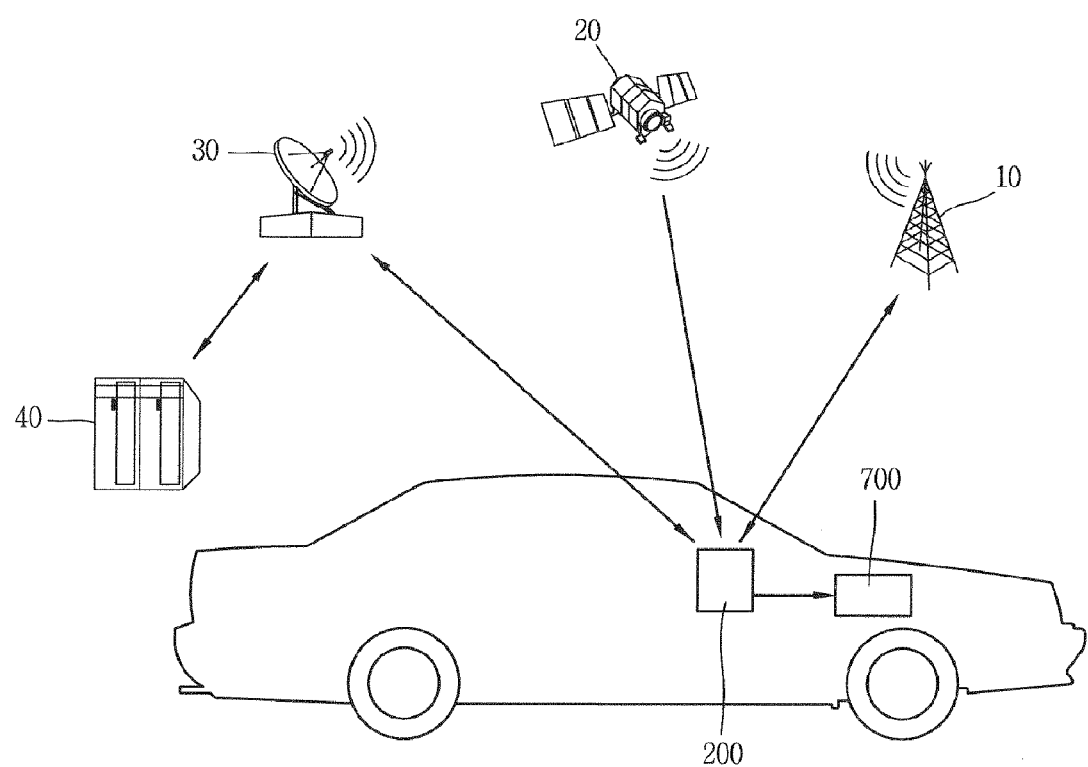
FIG. 2 is a block diagram illustrating a telematics terminal system according to an embodiment of the present disclosure.

FIG. 2 is a block diagram illustrating a telematics terminal system according to an embodiment disclosed herein.

As illustrated in FIG. 2, a vehicle telematics terminal system may be configured by including a information providing center 40 for providing traffic information and various data (for example, programs, execution files, etc.), and a telematics terminal 200 mounted within a vehicle for receiving traffic information through a long-range wireless communication network 30 and/or a short-range wireless communication network, and providing a road guide service based on a GPS signal received through a satellite 20 and the traffic information. The communication network may further include a wired or wireless communication network such as local area network (LAN), wide area network (WAN), and the like.

Various traffic information (for example, road traffic information or interesting area information) as well as traffic light information are collected via the communication network, and the collected information are processed by the information providing center 40 (for example, a server) according to Transport Protocol Expert Group (TPEG) standard so as to be sent to a broadcasting station. Accordingly, the broadcasting station inserts such traffic information including the traffic light information in a broadcast signal and broadcasts the broadcast signal to the telematics terminal 200. Here, the traffic light information may alternatively be received from a server (not shown) installed in a traffic light when a vehicle approaches the corresponding traffic light.

The server may reconstruct various traffic information, which are collected via different paths connected to the communication network, for example, collected by an operator's input, via a wired/wireless Internet and digital broadcast services, such as Transport Data Channel (TDC) and Multimedia Object Transport (MOC), or from other servers or a probe car, into a traffic information format, such as a format according to the TPEG standard, which is a standard for traffic information services, thereby sending the reconstructed traffic information to the broadcasting station.

The server may thus generate the traffic information format of the TPEG standard including traffic light information to send to the broadcasting station.

The broadcasting station may then load the traffic information including the traffic light information received from the server in a broadcast signal and wirelessly send the broadcast signal to the telematics terminal 200, for example, a navigation apparatus, which is mounted in the vehicle to play a role of a traffic information receiving terminal. The traffic information may include not only the traffic light information but also information related to various traffic conditions, which are required for running vehicles, ships and flights, such as accidents, road conditions, traffic jam, road construction, road block, public traffic network delay, flight delay and the like.

The broadcasting station may receive the traffic information including the traffic light information processed by the server, and send the same to the telematics terminal 200 via a digital signal according to various digital broadcasting standards, examples of which may include European Digital Audio Broadcasting (DAB) based on Eureka-147 [ETSI EN 300 401], Digital Multimedia Broadcasting-terrestrial/satellite (DMB-T/S), Digital Video Broadcasting-terrestrial (DVB-T), portable Digital Video Broadcasting-Handheld (DVB-H), Media Forward Link Only (MFLO), and the like.

Also, the broadcasting station may send the traffic information including the traffic light information via a wired/wireless network, such as a wired/wireless Internet.

The vehicle having the telematics terminal 200 indicates any transport of a typical car, bus, train, ship, flight and the like, which are made by employing mechanical and electronic devices for the purpose of carrying or transporting humans or objects.

The vehicle has a traffic information receiving terminal to receive traffic light information from the broadcasting station. The traffic light information is processed to be sent to a user in a graphic, text and/or audio format(s).

Meanwhile, the telematics terminal 200 may include a mobile communication module. The mobile communication module may send and receive wireless signals to/from at least one of a base station 10, an external terminal and a server over a mobile communication network. Here, the wireless signals may include a voice call signal, a telephony call signal and/or various types of data in response to transmission/reception of text/multimedia messages.

Furthermore, the telematics terminal 200 may communicate with a vehicle terminal 700 using a wired/wireless communication technology. The vehicle terminal 700 may perform a typical vehicle control, provide vehicle related information such as speed, gear state and the like, turn an emergency light of the vehicle on/off, turn a headlight on/off, determine whether or not a passenger has taken a seat by a sensor installed within a seat in the vehicle, blow a horn and the like. The vehicle terminal 700 may include a head-up display (HUD) or projector.

Hereinafter, description will be given of a configuration of the telematics terminal 200 having the communication terminal with reference to FIG. 3.

Figure 3:
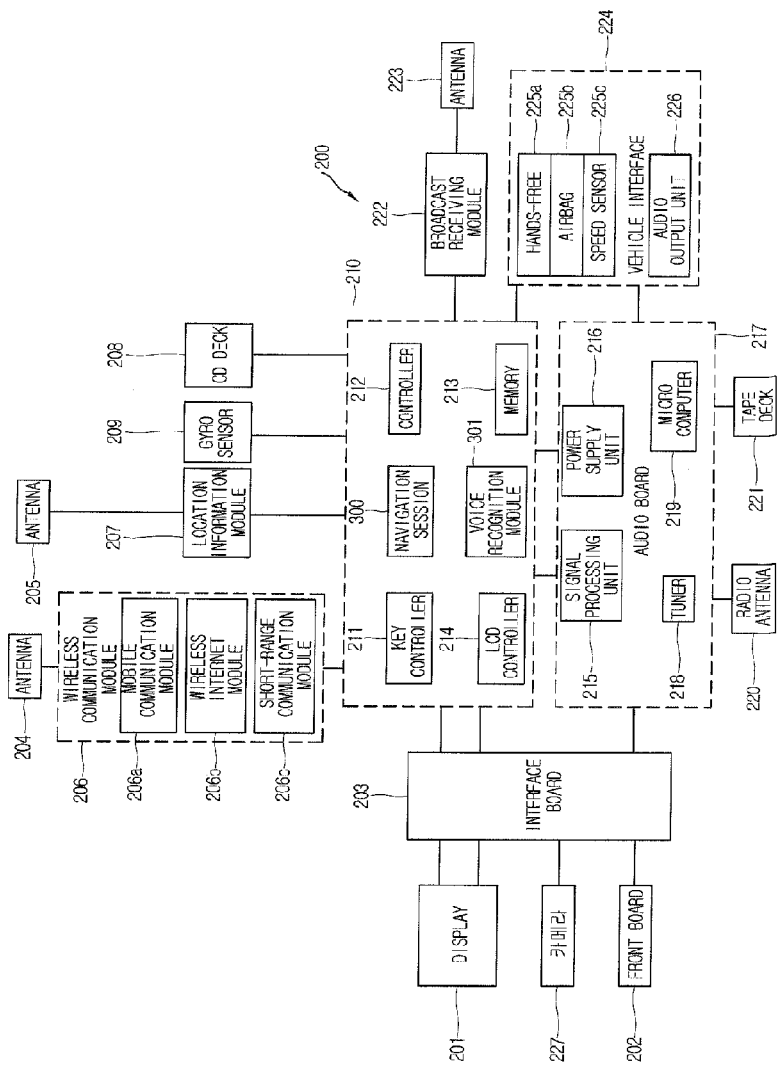
FIG. 3 is a block diagram illustrating the configuration of a telematics terminal according to an embodiment of the present disclosure.

FIG. 3 is a block diagram illustrating a configuration of a telematics terminal having a communication terminal according to an exemplary embodiment disclosed in this specification.

As shown in FIG. 3, the telematics terminal 200 may include a main board 210. The main board 210 may include a controller (for example, a central processing unit (CPU)) 212 for overall control of the telematics terminal 200, a memory 213 for storing various types of information, a key controller 211 for control of various types of key signals, and a liquid crystal display (LCD) controller 214 for control of LCD.

The memory 213 may store map information (map data) for displaying road guidance information on a digital map. Also, the memory 213 may store a traffic information collection control algorithm for allowing input of traffic information according to road conditions that a vehicle is currently traveling, and information for control of the algorithm.

The main board 210 may include a wireless communication module 206 for performing wireless communications between the telematics terminal 200 and a wireless communication system or between the telematics terminal 200 and a network in which the telematics terminal 200 is present, a location information module 207 for receiving a Global Positioning System (GPS) signal to guide a location of a vehicle, track a traveling route from a depart point to an arrival point, etc., or transmitting traffic information collected by a user using a GPS signal, a compact disk (CD) deck 208 for reproducing a signal recorded on a CD; a gyro sensor 209, and the like. The wireless communication module 206 and the location information module 207 may transmit and receive signals via corresponding antennas 204 and 205, respectively.

The wireless communication module 206 may include a mobile communication module 206a as a mobile communication terminal having a uniquely given device number for transmitting and receiving wireless signals with at least one of a base station, an external terminal and a sever over a mobile communication network, a wireless Internet module 206b for allowing wireless Internet access by technologies, such as Wireless LAN (WLAN), Wi-FI, Wireless broadband (Wibro), World Interoperability for Microwave Access (Wimax), High Speed Downlink Package Access (HSDPA) and the like, and a short-range communication module 206c for performing communications by technologies, such as Bluetooth, Radio Frequency IDentification (RFID), Infrared Data Association (IrDA), Ultra WideBand (UWB), ZigBee, Wireless LAN (protocols such as Bluetooth, 802.11n, etc.) and the like.

Furthermore, the broadcast receiving module 222 may be connected to the main board 210 to receive a broadcast signal via an antenna 223. The main body 210 may be connected, via an interface board 203, with a display (LCD) 201 controlled by the LCD controller 214, a front board 202 controlled by the key controller 211, and a camera 227 for capturing inside and/or outside of the vehicle. The display 201 may display various video signals, text signals and the like. The front board 202 may be provided with buttons for various types of key signal inputs, and provide a key signal corresponding to the user-selected button to the main board 210. Also, the display 201 may include the proximity sensor and the touch sensor (touch screen) shown in FIG. 2.

The front board 202 may include a menu key for allowing direct input of traffic information. The menu key may be controlled by the key controller 211.

An audio board 217 may be connected to the main board 210 to process various audio signals. The audio board 217 may include a microcomputer 219 for control of the audio board 217, a tuner 218 for receiving a radio signal, a power supply unit 216 for supplying power to the microcomputer 219, and a signal processor 215 for processing various audio signals.

Furthermore, the audio board 217 may also include a radio antenna 220 for receiving a radio signal, and a tape deck 221 for reproducing an audio tape. The audio board 217 may further include an audio output unit (for example, amplifier) 226 for outputting an audio (voice) signal processed in the audio board 217.

The audio output unit (amplifier) 226 may be connected to a vehicle interface 224. That is, the audio board 217 and the main board 210 may be connected to the vehicle interface 224. The vehicle interface 224 may also be provided for connection of a hands-free 225a for inputting a voice signal, an airbag 226b for safety of a passenger, a speed (velocity) sensor 225c for detecting the vehicle speed, and the like. The speed sensor 225c may calculate the vehicle speed and provide the calculated speed information to the controller (CPU) 212.

A navigation session 300 applied to the telematics terminal 200 may generate road guidance information based upon map data and current location information related to the vehicle, and notify a user of the generated road guidance information.

The display 201 may detect a proximity touch within a display window via a proximity sensor. For example, the display 201 detects a location of a proximity touch when a pointer (for example, a finger or a stylus pen) generates the proximity touch, and outputs location information corresponding to the detected location to the controller 212.

A voice recognition device (or voice recognition module) 301 may recognize a user's voice, and perform a corresponding function according to the recognized voice signal.

The navigation session 300 applied to the telematics terminal 200 may display a driving route on map data.

On the other hand, the telematics terminal 200 to which the electronic device according to an embodiment disclosed herein may include a user input unit (not shown) configured to receive destination information to retrieve a destination and a retrieval unit (not shown) configured to retrieve an eco-driving route capable of minimizing the fuel consumption amount of a vehicle among driving routes for reaching a location corresponding to the received destination information.

Meanwhile, the controller 180 may modify a prestored fuel table based on an actually consumed fuel amount while driving the vehicle, and the retrieval unit 183 may retrieve the eco-driving route using the modified fuel table.

Here, the modified fuel table may reflect an actually consumed fuel amount while a vehicle's driver actually drives the vehicle. Furthermore, the actually consumed fuel amount may be dependent on cause information, and the cause information may include at least one of topographical information, driving habit information of a driver who drives the vehicle and the status information of the vehicle. In other words, the controller 180 may monitor the actually consumed fuel amount along with the cause information, and thus may not retrieve a driving route corresponding to the cause information of a location at which the actually consumed fuel amount is greater than the reference value when retrieving the eco-driving route.

Meanwhile, map data for retrieving a driving route may be stored in the memory 213 or received from an external network through the wireless communication unit 110.

According to an embodiment disclosed herein, the telematics terminal 200 may perform communication with a vehicle terminal 700 mounted on the vehicle through the wireless communication module 206. The vehicle terminal 700 is a device for performing control on a vehicle mounted with the vehicle terminal 700, or transmitting information for the vehicle. For instance, the vehicle terminal 700 may perform on/off control for vehicle emergency lights, perform on/off control for headlights, determines whether or not a passenger has been seated through a sensor installed on a seat within the vehicle, or perform on/off control for a horn. Furthermore, the vehicle terminal 700 may include a head-up display (HUD) or projector.

Specifically, according to an embodiment disclosed herein, the controller 180 of the telematics terminal 200 may provide a driving route retrieved through the retrieval unit 183 through the display unit 151 contained in the electronic device 100, and moreover, may provide the retrieved driving route to the vehicle through communication with the vehicle terminal 700.

Accordingly, the controller 212 may control such that the driving route is displayed on a dashboard of the vehicle through the vehicle terminal 700 or displayed on a front glass of the vehicle using the head-up display (HUD) or projector through the vehicle terminal 700. The head-up display (HUD) may be mounted on a dashboard of the vehicle, and generally known methods may be used for the HUD and the projector, and thus the detailed description thereof will be omitted.

Hereinafter, a method of retrieving an eco-driving route will be described in more detail with reference to the configuration of an electronic device illustrated in FIG. 1 along with reference to the accompanying drawings.

Figure 4:
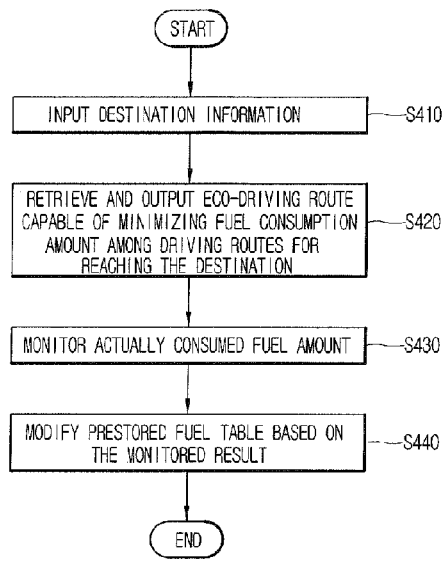
FIG. 4 is a flow chart for explaining a control method of an electronic device according to an embodiment of the present disclosure.
Figure 5A:
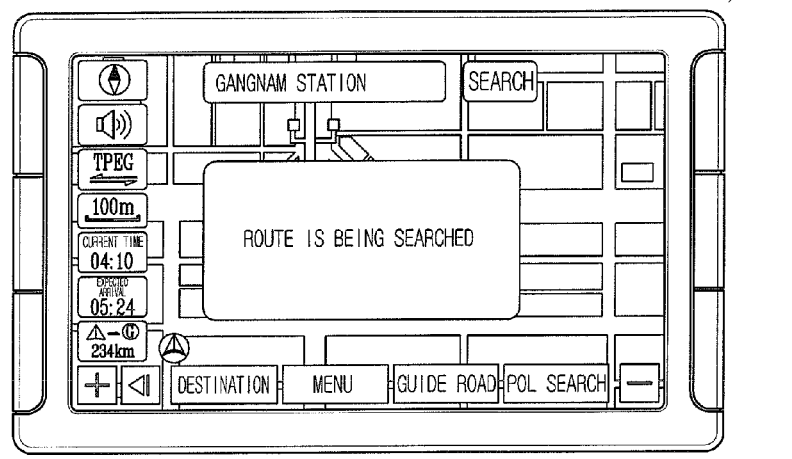
Figure 5A:
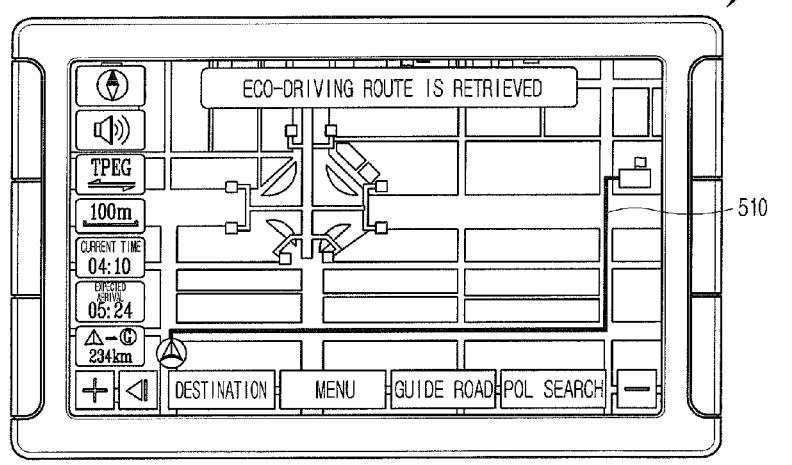
Figures 5B, 6A:
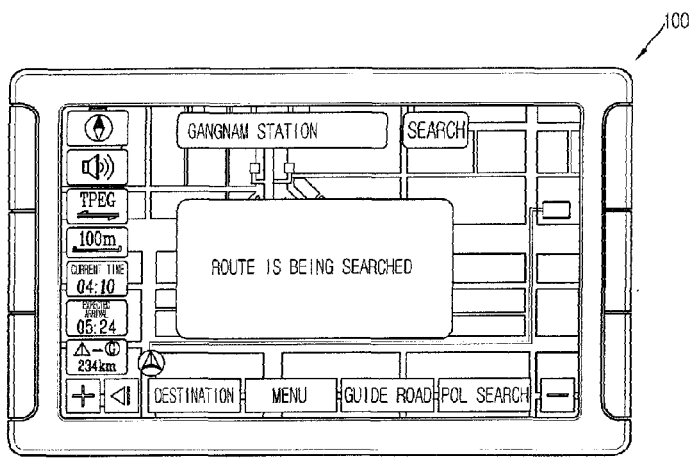

FIG. 4 is a flow chart for explaining a control method of an electronic device according to an embodiment of the present disclosure, and FIGS. 5A and 5B are conceptual views for explaining a control method described in FIG. 4.

An electronic device according to an embodiment of the present disclosure may retrieve a location where the user wants to move based on the user's request, and provide route information for the retrieved location. Here, the route information may be provided through a navigation session (or retrieval unit 183), and the navigation session (or retrieval unit 183, and hereinafter referred to as a "retrieval unit") can provide route information using map data stored in the memory 160 received through the wireless communication unit 110 (according to an embodiment of the present disclosure, the detailed description of a method for providing specific route information will be omitted).

On the other hand, when retrieving a location corresponding to the destination information received at the user input unit 122, 130 or 151, the retrieval unit 183 may retrieve an eco-driving route capable of minimizing the fuel consumption amount using a fuel table. Furthermore, the controller 180 may modify a fuel table based on the actually consumed fuel amount. Meanwhile, at this time, the retrieval unit 183 may retrieve an eco-driving route using the fuel table modified by the controller 180. Here, the modified fuel table may reflect an actually consumed fuel amount while a vehicle's driver actually drives the vehicle. Furthermore, the actually consumed fuel amount may be dependent on cause information, and the cause information may include at least one of topographical information, driving habit information of a driver who drives the vehicle and the status information of the vehicle. In other words, the controller 180 may monitor the actually consumed fuel amount along with the cause information, and thus may not retrieve a driving route corresponding to the cause information of a location at which the actually consumed fuel amount is greater than the reference value when retrieving the eco-driving route.

Specifically describing a method of providing an eco-driving route along with FIG. 4, according to an electronic device according to an embodiment of the present disclosure, destination information is received from the user (S410).

Here, the "destination information" is information associated with a location where the user wants to reach through the vehicle, and the destination information may be received through the user input interface 120, 130 or 151.

When destination information is received at the user input interface 120, 130 or 151, the retrieval unit 183 may retrieve an eco-driving route capable of minimizing the fuel consumption amount of a vehicle among driving routes for reaching a location corresponding to the destination information using at least one of map data stored in the memory 160 or downloaded through the wireless communication unit 110. Furthermore, the retrieved eco-driving route is output through the output unit 150, for example, the display unit 151 or audio output module 152 (S420).

Here, the eco-driving route (or fuel reduction route) is a driving route capable of minimizing the fuel consumption amount of a vehicle among various driving routes for reaching a location corresponding to the destination information.

The retrieval unit 183 may refer to a fuel table to retrieve an eco-driving route. The fuel table may be stored in the memory 160 or downloaded from an external server through the wireless communication unit 110.

The fuel table may be configured in various manners, and for an example, the fuel table may be composed of expected fuel consumption amount values at a predetermined slope and speed. In other words, the retrieval unit 183 may use a fuel table to calculate the fuel efficiency of a vehicle (fuel amount consumed by a vehicle for each unit driving distance or each unit time) using a slope, a curvature, speed information or the like on map data.

In this manner, the retrieval unit 183 may retrieve a route capable of minimizing the fuel consumption amount as an eco-driving route with reference to a fuel table among driving routes for reaching the destination.

On the other hand, the eco-driving route may be retrieved only for a case when the user requests retrieval for an eco-driving route or provided all the time along with other driving routes.

In this manner, when the eco-driving route is retrieved, the controller 180 may display route information 510 corresponding to the eco-driving route on the display unit 151 as illustrated in FIGS. 5A and 5B.

Furthermore, the controller 180 may provide another driving route in addition to the eco-driving route as illustrated in FIGS. 5A and 5B. For example, the controller 180 may provide the shortest route 520 to the user along with the eco-driving route 510. Furthermore, the controller 180 may control the retrieval unit 183 to provide route information corresponding to either one selected by the user of the eco-driving route 510 and shortest route 520.

On the other hand, the controller 180 may monitor an actually consumed fuel amount while driving the vehicle independently from a route corresponding to eco-driving route driven by the vehicle (S430). In other words, the controller 180 may modifies the prestored or downloaded fuel table based on the monitored result (S440).

In other words, the controller 180 may reflect the actually consumed fuel amount on a fuel table to retrieve a more accurate eco-driving route.

On the other hand, the retrieval unit 183 may retrieve an eco-driving route using a fuel table modified through the steps of S430 and S440 when an eco-driving route is not initially retrieved using the eco-driving route during the step S420.

In this manner, according to an electronic device according to an embodiment of the present disclosure, a fuel table may be modified based on the actually consumed fuel amount while driving the vehicle, thereby providing a more accurate eco-driving route.

Hereinafter, the process of modifying a fuel table will be described in more detail along with the accompanying drawings.

FIGS. 6A, 6B, 7A and 7B are conceptual views for explaining a method of modifying a fuel table in an electronic device according to an embodiment of the present disclosure.

First, referring to FIG. 6A, a fuel table prior to modification is illustrated. For the fuel table, speed and slope values are divided for each preset interval, and expected fuel consumption amount values are filled in each speed and slope value (for example, the unit may be "liter (L)"). For example, when part of section of the driving route desired to be driven has a slope value with a large fuel consumption amount, the retrieval unit 183 may include a section with a small fuel consumption amount as the driving route to make a detour for the part of section thereof.

On the other hand, as described above, according to an electronic device according to an embodiment of the present disclosure, a fuel amount consumed by the vehicle may be monitored. The controller 180 may perform monitoring for the consumption fuel amount at preset time intervals.

In this manner, when the actually consumed fuel amount is monitored, and the monitored result is different from an expected fuel consumption amount contained in the fuel table, the controller 180 may modify the fuel table by adding or subtracting a difference value between the expected fuel consumption amount and the actually consumed fuel amount to or from the fuel table.

For example, when expected fuel consumption amounts corresponding to the first through the seventh table values 601*a*, 602*a*, 603*a*, 604*a*, 605*a*, 606*a*, 607*a* are different from the actually consumed fuel amounts as illustrated in FIG. 6A, the controller 180 may change them to the first through the seventh table values 601*b*, 602*b*, 603*b*, 604*b*, 605*b*, 606*b*, 607*b* to reflect the actually consumed fuel amounts on the fuel table.

Accordingly, the retrieval unit 183 retrieves an eco-driving route using the modified fuel table, thereby substantially retrieving a driving route with a small fuel consumption amount.

On the other hand, when the fuel table is changed, the controller 180 may change another table value associated with the specific table value to correspond to the actually consumed fuel amount based on an actually consumed fuel amount corresponding to the modified specific table value.

For example, as illustrated in FIG. 7A(a), a fuel consumption amount may be shown in a two-dimensional speed graph for each angular speed at a specific slope value. For example, in case where the graph illustrated in FIG. 7A(a) is a two-dimensional graph corresponding to an fuel consumption amount at an angular speed at slope "6" in the fuel graph illustrated in FIG. 6A, the controller 180 may modify such a two-dimensional graph based on the actually consumed fuel amount as illustrated in FIGS. 7A(b) and 7A(c). In this case, the controller 180 is able to modify a two-dimensional graph using a regression analysis. In this manner, the controller 180 may use several modified fuel consumption amounts for a specific slope value using a regression analysis, thereby acquiring an overall modified fuel consumption amount for the specific slope value as illustrated in FIG. 7B.

Accordingly, as illustrated in FIG. 7B, the controller 180 may prepare a modified fuel table based on the actually consumed fuel amount at slope "6".

In the above, the process of modifying a fuel table based on the actually consumed fuel amount has been described. Moreover, according to an electronic device according to an embodiment of the present disclosure, it may be possible to monitor cause information, which is a cause for fuel consumed in a large or small scale, along with the actually consumed fuel amount. In other words, when the actually consumed fuel amount in the vehicle is greater or less than a preset average value, the controller 180 may monitor cause information in which fuel is consumed in the vehicle to store it in the memory. Then, the retrieval unit 183 may remove a section corresponding to the cause information in which the fuel consumption amount is large from the driving route with reference to the cause information when retrieving an eco-driving route, and add a section corresponding to the cause information in which the fuel consumption amount is small to the driving route.

Figure 9B:
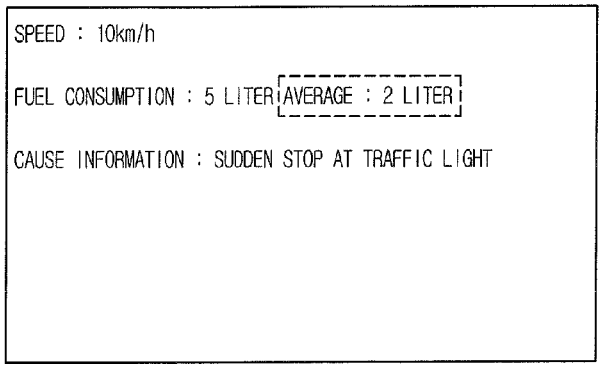
Figure 9B:
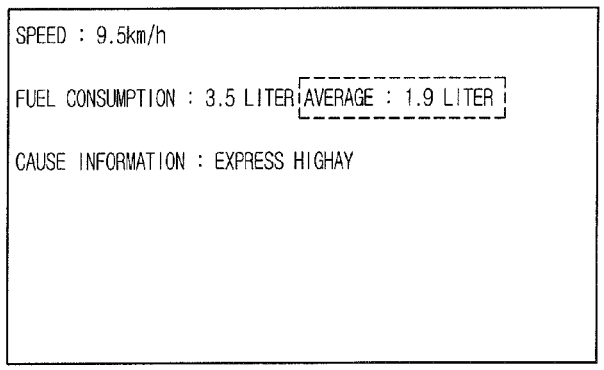

Hereinafter, a method of monitoring cause information and reflecting it on the fuel table will be described in more detail with reference to the accompanying drawings. FIGS. 8A, 8B and 8C are conceptual views for explaining a method of providing a customized fuel table in an electronic device according to an embodiment of the present disclosure, and FIGS. 9A and 9B are conceptual views for explaining cause information in an electronic device according to an embodiment of the present disclosure.

Cause information is information on a cause of fuel amount consumed in the vehicle, and may include at least one of topographical information, driving habit information of a driver who drives the vehicle and the status information of the vehicle.

The fuel amount actually consumed in the vehicle may be largely dependent on the cause information, and thus the controller 180 may store the cause information in the memory 160 and control the retrieval unit 183 to retrieve an eco-driving route with reference to the cause information.

Accordingly, a fuel table 810, status information 820, driver information 830, and the like may be stored in the memory 160, respectively, as illustrated in FIG. 8A, and in addition, various kinds of cause information may be additionally stored therein. Furthermore, the controller 180 may control the memory 160 such that the fuel tables 810 and cause information are stored in a matched manner, respectively. Accordingly, when part of section of the driving route to a location corresponding to destination information is a section corresponding to cause information with a large fuel consumption amount, the retrieval unit 183 may retrieve an eco-driving route in which the part of section thereof is not contained.

More specifically describing the cause information, status information may refer to the status information of a vehicle, and may include at least one of a type of engine, a deterioration level of engine, a tire pressure, and a status of engine oil and break. Furthermore, the status information of a vehicle may further include various information associated with the vehicle. The status information of a vehicle may be stored in an appropriate manner to be recognized by the retrieval unit 183, and for example, the status of a vehicle may be shown through values.

In this manner, when the retrieval unit 183 retrieves an eco-driving route with reference to the status information of the vehicle, the retrieval unit 183 may retrieve a driving route for which the fuel consumption amount is expected to be small as an eco-driving route according to the status of the vehicle. For example, when a deterioration level of engine is severe, the retrieval unit 183 may retrieve an eco-driving route to contain more roads corresponding to flat or downhill roads than uphill roads.

Next, more specifically describing other cause information, the driver information may include a series of information associated with a vehicle's driver, such as sex, age, character, driving experience, preferred roads, a level of signal observance, a level of overspeed, and the like.

For example, when the retrieval unit 183 retrieves an eco-driving route with reference to driver information, the retrieval unit 183 may retrieve a driving route with a small number of traffic signals when it is determined that the fuel consumption amount is large because of a lot of sudden stops at traffic signals as a result of referring to the fuel table and cause information.

Next, more specifically describing other cause information, the topographical information may include information associated with the topography of a driving route such as a driving route slope, a signal light layout level and a road characteristic. The controller 180 may control the retrieval unit 183 to monitor an actually consumed fuel amount along with this topographical information and then retrieve a driving route with a smaller actually consumed fuel amount.

Hereinafter, a specific embodiment of referring to cause information when the retrieval unit 183 retrieves an eco-driving route will be described.

For example, when retrieving an eco-driving route, the retrieval unit 183 may refer to both the fuel table and cause information to determine whether the eco-driving route contains more express highways or general roads.

As illustrated in FIG. 9A, speed information, a fuel consumption amount, cause information, and the like may be matched to each other to be stored in the memory 160.

The controller 180 may monitor an actually consumed fuel amount based on the unit of kilometer when the vehicle drives an express highway and an actually consumed fuel amount based on the unit of kilometer when the vehicle drives a general road, and store them as illustrated in FIGS. 9A(a) and 9A(b).

Accordingly, fuel consumption amount 12.5 L and cause information "express highway" may be stored together in match with a speed corresponding to "75 km/h" as illustrated in FIG. 9A(a), and fuel consumption amount 40.4 L and cause information "general road" may be stored together in match with a speed corresponding to "74 km/h" as illustrated in FIG. 9A(b).

Then, the retrieval unit 183 can retrieve a driving route containing more general roads with fuel consumption amounts less than the average consumption amount as an eco-driving route with reference to information stored in the memory 160 as illustrated in FIG. 9A.

For another example, fuel consumption amount 5 L and cause information "sudden stop at traffic light" may be stored together in match with a speed corresponding to "10 km/h" as illustrated in FIG. 9B(a), and fuel consumption amount 3.5 L and cause information "express highway" may be stored together in match with a speed corresponding to "9.5 km/h" as illustrated in FIG. 9B(b).

Then, the retrieval unit 183 can retrieve a driving route around express highways that do not contain traffic lights less than the average consumption amount as an eco-driving route with reference to information stored in the memory 160 as illustrated in FIG. 9B.

As described above, according to an electronic device according to an embodiment of the present disclosure, an eco-driving route may be retrieved with reference to cause information, thereby substantially retrieving a driving route capable of further minimizing the fuel consumption amount as an eco-driving route.

On the other hand, the foregoing cause information may be collected from another external electronic device communicating data through the wireless communication unit 110 of the electronic device or an external server in addition to a method of collecting them by the electronic device itself. When the another external electronic device enters (for example, user's mobile phone) into the vehicle, the cause information may be transmitted to the electronic device through wireless communication with the electronic device.

Figures 10A, 10B:
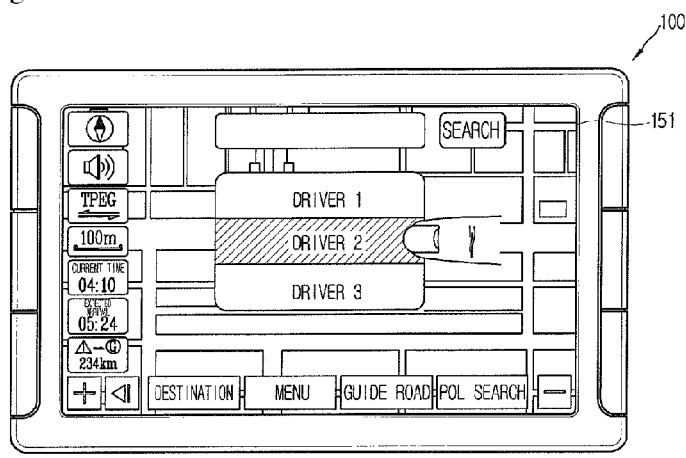

Hereinafter, a method of managing a fuel table will be described in more detail with reference to the accompanying drawings. FIGS. 10A, 10B and 10C are conceptual views for explaining a method of providing different fuel tables based on drivers in an electronic device according to an embodiment of the present disclosure.

According to an electronic device according to an embodiment of the present disclosure, when a fuel table is modified, the controller 180 may store the modified fuel table in the memory 160 separately from an initial fuel table. Then, the controller 180 may store the modified fuel table in connection with the driver. Accordingly, for the same driver, a fuel table modified for the same driver may be continuously updated.

In this manner, the controller 180 may generate at least one of different modified fuel tables to correspond to drivers who drive the vehicle, respectively, to store it in the memory. As a result, when a first driver of the drivers who drive the vehicle drives the vehicle, the controller 180 may reflect an actually consumed fuel amount monitored on a modified fuel table corresponding to the first driver.

Moreover, when the first driver drives the vehicle, the controller 180 may control the retrieval unit 183 to retrieve an eco-driving route with reference to a modified fuel table corresponding to the first driver. In this manner, the controller 180 may control the retrieval unit 183 to retrieve different eco-driving routes according to different drivers who drive the vehicle based on different fuel tables based on drivers who drive the vehicle.

Accordingly, individual fuel table may be stored for different drivers, respectively, as illustrated in FIGS. 10A(a), 10A(b) and 10A(c). Moreover, the controller 180 may store cause information corresponding to different drivers, respectively, in the memory 160, to be matched to fuel tables corresponding to the different drivers, respectively.

Accordingly, the retrieval unit 183 may retrieve an eco-driving route with reference to the fuel table and cause information corresponding to a driver who currently drives the vehicle among a plurality of fuel tables separately stored therein.

On the other hand, the controller 180 may use the identification information of a driver to identify the driver who currently drives the vehicle.

Here, the identification information of the driver is information capable of identifying a specific driver among a plurality of drivers, and the identification information of the driver may be directly received from a driver through the display unit 151, or though not shown in the drawing, received through the driver's voice as illustrated in FIG. 10B. When received through a drive's voice, the controller 180 may identify the driver through the driver's voice, or identify the driver by directly recognizing the identification information of the driver, for example, the driver's name uttered by the driver.

Furthermore, when another external electronic device 200 different from the electronic device 100 is identified in the vehicle 1000, a driver who enters into the vehicle may be identified as illustrated in FIG. 10C.

The wireless communication unit 110 of the electronic device 100 may identify the external electronic device 200 to acquire the identification information of the external electronic device 200 using any one of Bluetooth, Radio Frequency IDentification (RFID), Infrared Data Association (IrDA), Ultra WideBand (UWB), ZigBee, and Wireless LAN (protocols such as Bluetooth, 802.11n, etc.), and identify a driver who gets into the vehicle from the acquired identification information.

As described above, according to an electronic device according to an embodiment of the present disclosure, an eco-driving route may be retrieved through different fuel tables and cause information based on drivers, thereby providing a driver customized eco-driving route.

Figure 11A:
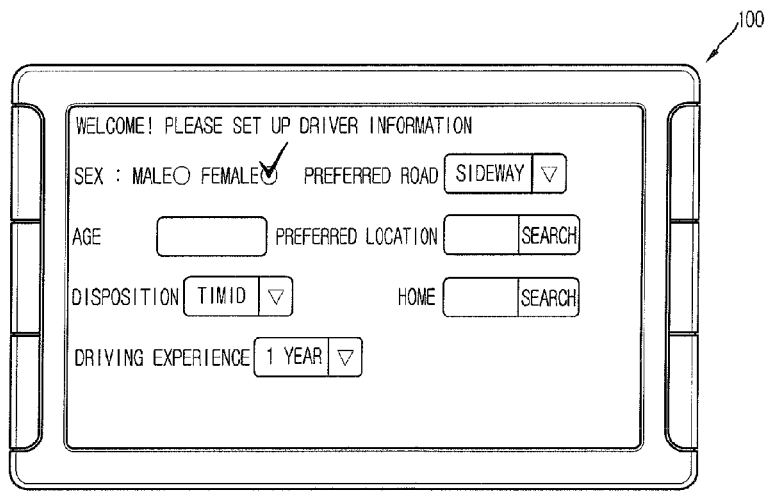
FIGS. 11A and 11B are conceptual views for explaining a method of acquiring a fuel table in an electronic device according to an embodiment of the present disclosure.
Figure 11B:
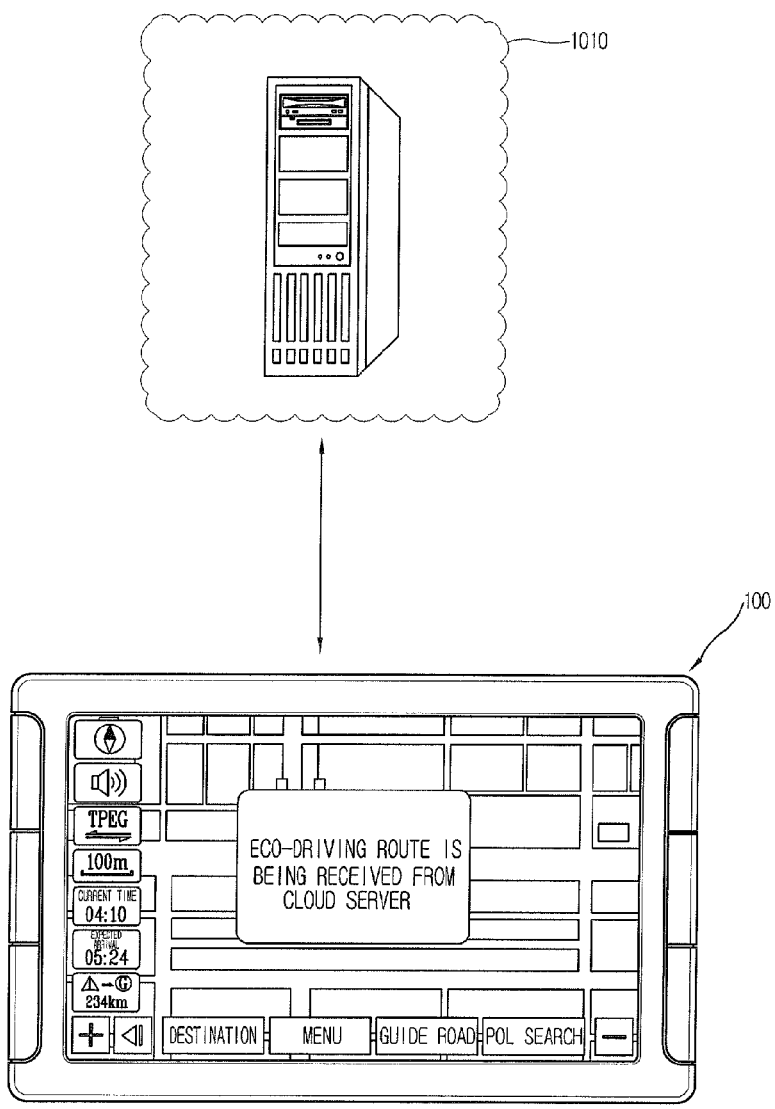

Hereinafter, a method of acquiring a fuel table from an external server will be described in more detail with reference to the accompanying drawings. FIGS. 11A and 11B are conceptual views for explaining a method of acquiring a fuel table in an electronic device according to an embodiment of the present disclosure.

According to an electronic device according to an embodiment of the present disclosure, a fuel table downloaded from an external server may be used in addition to a fuel table stored in the memory 160 and a modified fuel table on which the monitored result is reflected.

On the other hand, in order to download a driver customized fuel table, the controller 180 may collect information capable of determining the disposition of a driver from the driver as illustrated in FIG. 11A, and download a fuel table corresponding to the collected information from an external server 1010 (for example, cloud server) or external electronic device as illustrated in FIG. 11B.

In other words, the controller 180 may receive at least one disposition information from a driver who drives the vehicle, and a fuel table corresponding to the disposition information from the cloud server 1010 or external electronic device using wireless communication as illustrated in FIG. 11A. Furthermore, the retrieval unit 183 may retrieve the eco-driving route using at least one of a fuel table received from the cloud server 1010 or external electronic device and the prestored fuel table.

On the other hand, as illustrated in FIG. 11A, a plurality of question items capable of determining the disposition of a driver who drives the vehicle is displayed on the display unit, and the plurality of question items may be received from the cloud server 1010 or external electronic device.

Furthermore, the controller 180 may modify a fuel table received from the cloud server based on an actually consumed fuel amount while driving the vehicle similarly to a case where an eco-driving route retrieved using the fuel table received from the cloud server is selected, and the modified fuel table may be stored in the memory 160 separately from the downloaded fuel table or in the form of updating the downloaded fuel table.

As described above, according to an electronic device according to an embodiment of the present disclosure, a fuel table may be downloaded from the outside in addition to a prestored fuel table in the memory, thereby providing more various fuel tables to a driver.

According to an electronic device and control method thereof in accordance with an embodiment of the present disclosure, an actually consumed fuel amount may be reflected on the fuel table. Accordingly, a driving route capable of minimizing the actually consumed fuel amount may be recommended to a vehicle's driver.

Furthermore, according to an electronic device and control method thereof in accordance with an embodiment of the present disclosure, an actually consumed fuel amount may be continuously monitored while driving the vehicle, and the actually consumed fuel amount may be reflected on the fuel table, thereby providing a more accurate driving route capable of minimizing the fuel consumption amount as further driving the vehicle.

Furthermore, according to an electronic device and control method thereof in accordance with an embodiment of the present disclosure, different fuel tables may be prepared based on drivers, thereby providing a driver customized driving route.

Furthermore, according to an embodiment disclosed in the present disclosure, the foregoing method may be implemented as codes readable by a processor on a medium written with the program. The examples of the processor-readable media may include ROM, RAM, CD-ROM, magnetic tape, floppy disk, and optical data storage device, and the like, and also include a device implemented via a carrier wave (for example, transmission via the Internet).

The configurations and methods according to the above-described embodiments will not be applicable in a limited way to the foregoing electronic device, and all or part of each embodiment may be selectively combined and configured to make various modifications thereto.

The invention claimed is:

1. An electronic device, comprising:
a user input unit configured to receive destination information;
a memory unit configured to store a plurality of fuel tables corresponding to each of a plurality of cause information, wherein the cause information includes at least one of driving habit information of a driver and status information of a vehicle;
a retrieval unit configured to retrieve an eco-driving route capable of minimizing the fuel consumption amount of a vehicle among driving routes for reaching a location corresponding to the destination information; and
a controller configured to:
  select a fuel table among the plurality of fuel tables based on the at least one of the driving habit information of a driver and the status information of the vehicle;
  modify the selected fuel table based on an actually consumed fuel amount while driving the vehicle; and
  control the retrieval unit to retrieve an eco-driving route corresponding to the modified fuel table,
  wherein the controller monitors the actually consumed fuel amount with preset time intervals while driving the vehicle independently from retrieving the eco-driving route, and modifies the selected fuel table using the monitored result.

2. The electronic device of claim 1, wherein the controller subtracts a difference value between an expected fuel consumption amount contained in the selected fuel table and the actually consumed fuel amount to modify the selected fuel table.

3. The electronic device of claim 1,
wherein the controller monitors the cause information at the same time when monitoring the actually consumed fuel amount.

4. The electronic device of claim 3,
wherein the retrieval unit retrieves the eco-driving route corresponding to the modified fuel table different from an eco-driving route corresponding to the selected fuel table, when the actually consumed fuel amount is greater than a preset reference amount.

5. The electronic device of claim 1,
wherein the cause information further comprises information associated with at least one of a driving route slope, a signal light layout level and a road characteristic.

6. The electronic device of claim 5,
wherein the road characteristic is associated with whether the road being driven by the vehicle is an express highway or general road, and
the controller monitors an actually consumed fuel amount based on the unit of kilometer when the vehicle is driven on an express highway and a consumed fuel amount based on the unit of kilometer when the vehicle is driven on a general road, and
the controller controls the retrieval unit to retrieve a driving route corresponding to the road characteristic for which the actually consumed fuel amount is less than the other between the express highway and general road based on the monitored result.

7. The electronic device of claim 5,
wherein the status information of the vehicle is associated with at least one of a type of engine, a deterioration level of engine, and a tire pressure.

8. The electronic device of claim 1, further comprising:
a display unit,
wherein the retrieval unit retrieves at least one another driving route along with the eco-driving route, and
the controller controls the display unit to display a plurality of driving routes retrieved by the retrieval unit, and outputs expected fuel consumption amounts for the plurality of driving routes, respectively.

9. The electronic device of claim 1,
wherein the controller stores the modified fuel table in a memory separately from the selected fuel table.

10. The electronic device of claim 9,
wherein the controller generates at least one of different modified fuel tables to correspond to drivers who drive the vehicle, respectively, to store it in the memory, and reflects a fuel amount actually consumed by the vehicle on the modified fuel table corresponding to a first driver when the first driver drives the vehicle among drivers who drive the vehicle.

11. The electronic device of claim 10,
wherein the retrieval unit retrieves different eco-driving routes based on different drivers who drive the vehicle based on different modified fuel tables based on the driving habit information of a driver among a plurality of drivers who drive the vehicle.

12. The electronic device of claim 10,
wherein the controller retrieves a fuel table corresponding to the first driver among the different modified fuel tables using the identification information of the first driver,
and the identification information of the first driver is received from an external device through near field communication, received from the user through the display unit, or received through the first driver's voice.

13. The electronic device of claim 1,
wherein the controller receives at least one disposition information from a driver who drives the vehicle, and
receives a fuel table corresponding to the disposition information from a cloud server using wireless communication, and
the retrieval unit retrieves the eco-driving route using at least one of the fuel table received from the cloud server and the prestored fuel table.

14. The electronic device of claim 13,
wherein the controller outputs a plurality of question items capable of determining the disposition of a driver who drives the vehicle on the display unit, and acquires the disposition information through information input to the question items, respectively.

15. The electronic device of claim 13,
wherein the controller modifies a fuel table received from the cloud server based on an actually consumed fuel amount while driving the vehicle when an eco-driving route retrieved using the fuel table received from the cloud server is selected.

16. A control method of an electronic device, the method comprising:
- receiving destination information;
- selecting a fuel table among the plurality of fuel tables based on the at least one of information of a driver and the status information of the vehicle;
- retrieving an eco-driving route corresponding to a selected fuel table;
- monitoring an actually consumed fuel amount while driving the eco-driving route;
- modifying the selected fuel table using the monitored result; and
- controlling the retrieval unit to retrieve an eco-driving route corresponding to the modified fuel table,
- wherein said monitoring step monitors the actually consumed fuel amount with preset time intervals while driving the vehicle independently from retrieving the eco-driving route, and modifies the selected fuel table using the monitored result.

17. The method of claim 16,
wherein said modifying step modifies the selected fuel table by adding or subtracting the actually consumed fuel amount to or from the selected fuel table.

18. The method of claim 16,
wherein said retrieving step retrieves at least one different driving route along with the eco-driving route, and displays the plurality of retrieved driving routes on a display unit, and selects any one of the plurality of routes.

19. An electronic device, comprising:
- a user input unit configured to receive destination information;
- a retrieval unit configured to retrieve an eco-driving route capable of minimizing a fuel consumption amount of a vehicle among driving routes for reaching a location corresponding to the destination information; and
- a controller configured to:
  - receive driving habit information of a driver;
  - download a plurality of fuel tables from a server based on the driving habit information of a driver;
  - select a fuel table among the plurality of fuel tables based on the at least one of driving habit information of a driver and the status information of the vehicle;
  - modify the selected fuel table based on an actually consumed fuel amount while driving the vehicle;
  - control the retrieval unit to retrieve an eco-driving route corresponding to the modified fuel table.

20. The electronic device of claim 19,
wherein the controller is configured to display a plurality of question items which are received from the server on a display unit such that the driving habit information is received.

\* \* \* \* \*